(12) United States Patent
Lu et al.

(10) Patent No.: US 11,126,226 B2
(45) Date of Patent: Sep. 21, 2021

(54) BENDABLE DISPLAY PANEL HAVING BENDING DETECTION UNIT, AND DISPLAY APPARATUS COMPRISING THE SAME

(71) Applicant: SHANGHAI TIANMA AM-OLED CO., LTD., Shanghai (CN)

(72) Inventors: Feng Lu, Shanghai (CN); Liang Liu, Shanghai (CN); Conghua Ma, Shanghai (CN); Qijun Yao, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 0 days.

(21) Appl. No.: 16/460,887

(22) Filed: Jul. 2, 2019

(65) Prior Publication Data
US 2020/0209922 A1    Jul. 2, 2020

(30) Foreign Application Priority Data
Jan. 2, 2019   (CN) .......................... 201910001458.1

(51) Int. Cl.
  *G06F 1/16*      (2006.01)
  *G01B 7/30*     (2006.01)
  *G01L 1/22*     (2006.01)
  *G09F 9/30*     (2006.01)

(52) U.S. Cl.
  CPC ............. *G06F 1/1652* (2013.01); *G01B 7/30* (2013.01); *G01L 1/2262* (2013.01); *G09F 9/301* (2013.01); *G01L 1/2281* (2013.01)

(58) Field of Classification Search
  CPC ....... G06F 1/1652; G06F 1/1677; G01B 7/30; G01L 1/2262; G01L 1/2281; G09F 9/301
  See application file for complete search history.

(56) References Cited

U.S. PATENT DOCUMENTS

| | | | |
|---|---|---|---|
| 6,484,119 B1 | 11/2002 | Kaneo et al. | |
| 2007/0242033 A1 | 10/2007 | Cradick et al. | |
| 2011/0095974 A1 | 4/2011 | Moriwaki | |
| 2014/0285476 A1* | 9/2014 | Cho ................... | H04M 1/0268 345/204 |

(Continued)

FOREIGN PATENT DOCUMENTS

| | | | |
|---|---|---|---|
| CN | 101059950 A | 10/2007 | |
| CN | 102054399 A | 5/2011 | |

(Continued)

OTHER PUBLICATIONS

Office Action for Chinese Application No. 201910001458.1 dated Jul. 16, 2020.

*Primary Examiner* — James Wu
(74) *Attorney, Agent, or Firm* — Alston & Bird LLP

(57) ABSTRACT

A display panel and a display apparatus. The display panel includes at least one first region, at least two second regions, and a detection layer. The first region and the second region are adjacently arranged along a first direction, and the first region is located between adjacent second regions. The first region is bent, and the second region is not bent, in a case that the display panel is bent. The detection layer includes at least one detection unit, the detection unit is located in the second region, the detection unit does not overlap with the first region, and the detection unit is configured to detect bending of the first region. The display panel has high detection accuracy and strong detection capability.

16 Claims, 13 Drawing Sheets

(56) References Cited

U.S. PATENT DOCUMENTS

| | | | |
|---|---|---|---|
| 2015/0185787 A1* | 7/2015 | Choi | G06F 1/1616 |
| | | | 345/156 |
| 2016/0085268 A1* | 3/2016 | Aurongzeb | G06F 1/1652 |
| | | | 345/156 |
| 2016/0190216 A1 | 6/2016 | Yang | |
| 2017/0060189 A1 | 3/2017 | Sohn et al. | |
| 2017/0220191 A1* | 8/2017 | Liu | G06F 3/0412 |
| 2017/0285864 A1* | 10/2017 | Pedder | G01L 1/205 |
| 2018/0040678 A1 | 2/2018 | Zhai | |
| 2018/0074622 A1 | 3/2018 | Zhu | |
| 2018/0151130 A1 | 5/2018 | Bi | |

FOREIGN PATENT DOCUMENTS

| | | |
|---|---|---|
| CN | 105427761 A | 3/2016 |
| CN | 105741687 A | 7/2016 |
| CN | 105845222 A | 8/2016 |
| CN | 106486039 A | 3/2017 |
| CN | 106652802 A | 5/2017 |
| CN | 107121344 A | 9/2017 |
| CN | 107195253 A | 9/2017 |
| CN | 107195667 A | 9/2017 |
| CN | 107272961 A | 10/2017 |
| CN | 107331300 A | 11/2017 |
| CN | 107657894 A | 2/2018 |
| CN | 107885277 A | 4/2018 |
| CN | 108986671 A | 12/2018 |
| CN | 109062436 A | 12/2018 |
| EP | 2908342 A1 | 8/2015 |
| KR | 20170025870 A | 3/2017 |
| TW | I248574 B | 2/2006 |

\* cited by examiner

BENDABLE DISPLAY PANEL HAVING BENDING DETECTION UNIT, AND DISPLAY APPARATUS COMPRISING THE SAME

The application claims the priority to Chinese patent application No. CN 201910001458.1 titled "DISPLAY PANEL AND DISPLAY APPARATUS", filed on Jan. 2, 2019 with the National Intellectual Property Administration of People's Republic of China, which is incorporated herein by reference in its entirety.

FIELD

The present disclosure relates to the technical field of displays, and in particular, to a display panel and a display apparatus.

BACKGROUND

With the development of display technologies, flexible displays have gradually been applied to display equipment such as televisions, mobile phones, and tablet computers, and have become a focus of research and development in the field of display at present. For a conventional flexible display, a detection unit is usually arranged in a bending region of a display panel, so as to detect a state of bending of the display panel. Accuracy of a detection result obtained by such manner of detection remains an issue.

SUMMARY

To address the above technical issue, a display panel and a display apparatus are provided according to the present disclosure, so as to improve accuracy for detecting a state of bending.

A display panel includes at least one first region and at least two second regions, where the at least one first region and the at least two second regions are adjacently aligned along a first direction, and each of the at least one first region is located between adjacent ones of the at least two second regions;

where the at least one first region is bent, and the at least two second regions are not bent, in a case that the display panel is bent; and where the display panel further includes a detection layer, the detection layer includes at least one detection unit, the at least one detection unit is located in the at least two second regions, the at least one detection unit does not overlap with the at least one first region, and the at least one detection unit is configured to detect bending of the at least one first region.

A display apparatus is provided, including any one of the aforementioned display panels.

In the display panel according to one embodiment of the present disclosure, the detection unit is arranged in the second region adjacent to the first region. Namely, the detection unit is arranged in the non-bending region adjacent to the bending region. A strain output from the detection unit in the non-bending region can be used to detect the bending angle of the display panel, and accuracy of an obtained detection result is high.

Further, in the display panel according to one embodiment of the present disclosure, the detection unit is arranged in the second region. By using a monotonic deformation rule of the second region in bending the display panel, not only a state of bending is detectable in a case that the display panel is folded, but also a state of bending is detectable in a case that the display panel is bent with any bending angle.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

In the following description, numerous specific details are illustrated in order to provide a thorough understanding of the present disclosure. The present disclosure may also be carried out in ways other than those described herein. A person skilled in the art can make a similar deduction without departing from the spirit of the present disclosure, and thus the present disclosure is not limited by the specific embodiments disclosed hereinafter.

As described in the background, a conventional flexible display usually is arranged to have a detection unit at a bending region of the display panel to detect bending. It is not often very accurate.

A strain at a bending position always changes during the bending of the display panel. Specifically, bending of the display panel is localized, a non-bending portion is attached to a hard substrate, and such mechanical structure is complicated. The bending portion is strongly restrained by relative motion of the non-bending regions at both ends of the bending area (note that such bending motion is not uniform in most cases). Thereby, there is a non-monotonic effect of the strain in the bending region during bending of the display panel, for example, the strain may first increases, then decreases, and then increases again.

Figure 1:
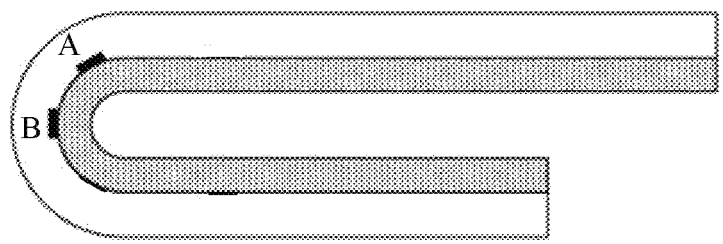
FIG. 1 is a schematic diagram of a folded display panel having a detection unit.
Figure 2:
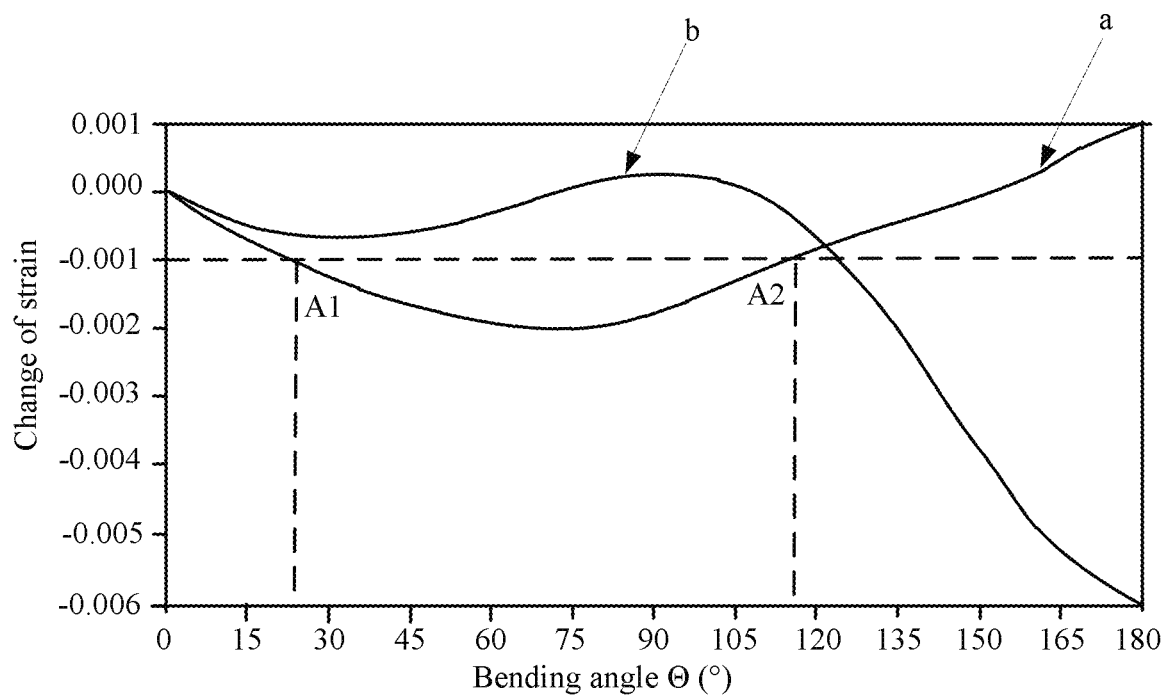
FIG. 2 is a graph of strain signals output from detection unit with respect to bending angles in the display panel, in FIG. 1.

Reference is made to FIGS. 1 and 2. Curve a is the signal output from a detection unit versus the bending angle, when the detection unit is located at point A of a bending region of flexible display. Curve b is the signal output versus bending angles when the detection unit is located at point B of a bending region. As can be seen from FIG. 2, when the bending angle increases, the signal output from the detection unit located at point A first increases and then decreases with the increase of the bending angle, and the signal output by the detection unit located at point B in the bending region first increases, then decreases and then increases with the increase of the bending angle. In the case that the signal output from the detection unit at point A in the bending region is −0.001, it cannot be determined whether the bending angle of the flexible display is 22° or 117°. It can be seen that a non-monotonic bending signal is not suitable for bending detection.

Figure 3:
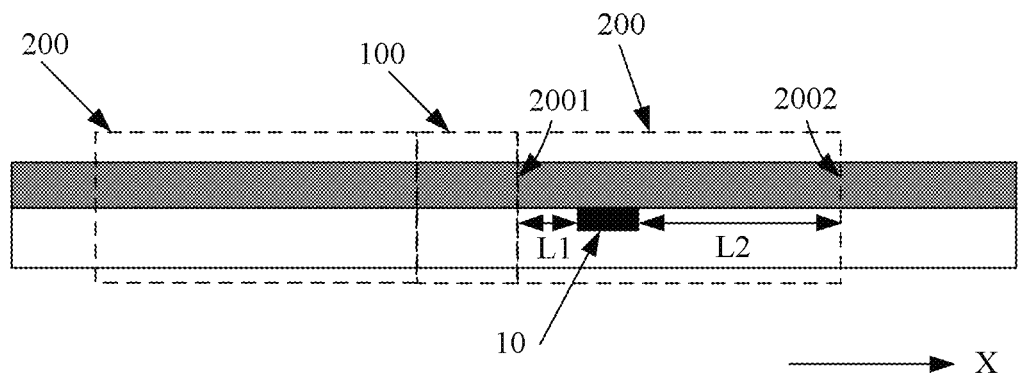
FIG. 3 is a schematic diagram of a flat display panel having a detection unit, according to an embodiment of the present disclosure.
Figure 4:
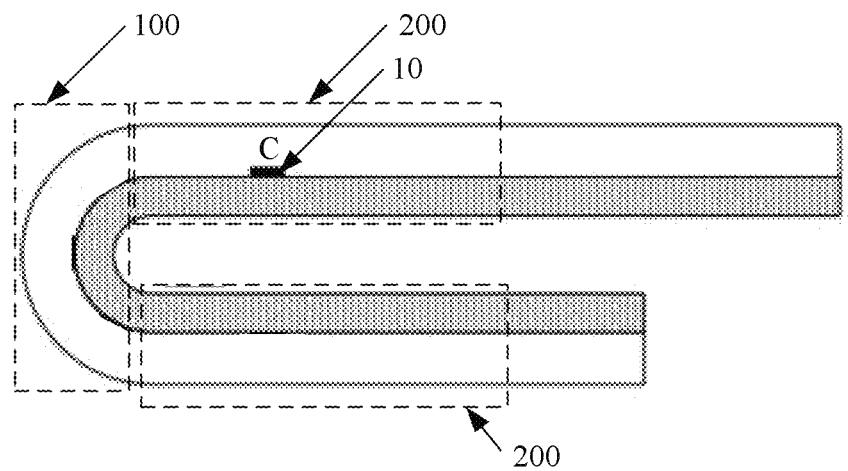
FIG. 4 is schematic diagram of a folded display panel having a detection unit according to an embodiment of the present disclosure.

In view of the above, a display panel is provided according to an embodiment of the present disclosure, as shown in FIG. 3 and FIG. 4. The display panel includes at least one first region 100 and at least two second regions 200. The first region 100 and the second regions 200 are aligned along a first direction without bending in FIG. 3. The first region 100 is located between two second regions 200. In an embodiment of the present disclosure as shown in FIG. 4, in a case that the display panel is bent, the first region 100 is bent, and the second regions 200 are not bent. When the display panel is bent, the first region 100 is located in a bended region of the display panel, and the second regions 200 are located outside the bending region of the display panel. Additionally, the display panel further includes a detection layer. The detection layer includes at least one detection unit 10. The detection unit 10 is located in the second region 200. The detection unit 10 does not overlap with the first region 100. The detection unit 10 is configured to detect bending of the first region 100. It should be noted that, in this embodiment of the present disclosure, the detection unit 10 may be located in the second region 200 on either side of the first region 100. The case is not limited herein and depends on a specific situation. In one embodiment, the detection unit 10 is a strain sensor.

Figure 5:
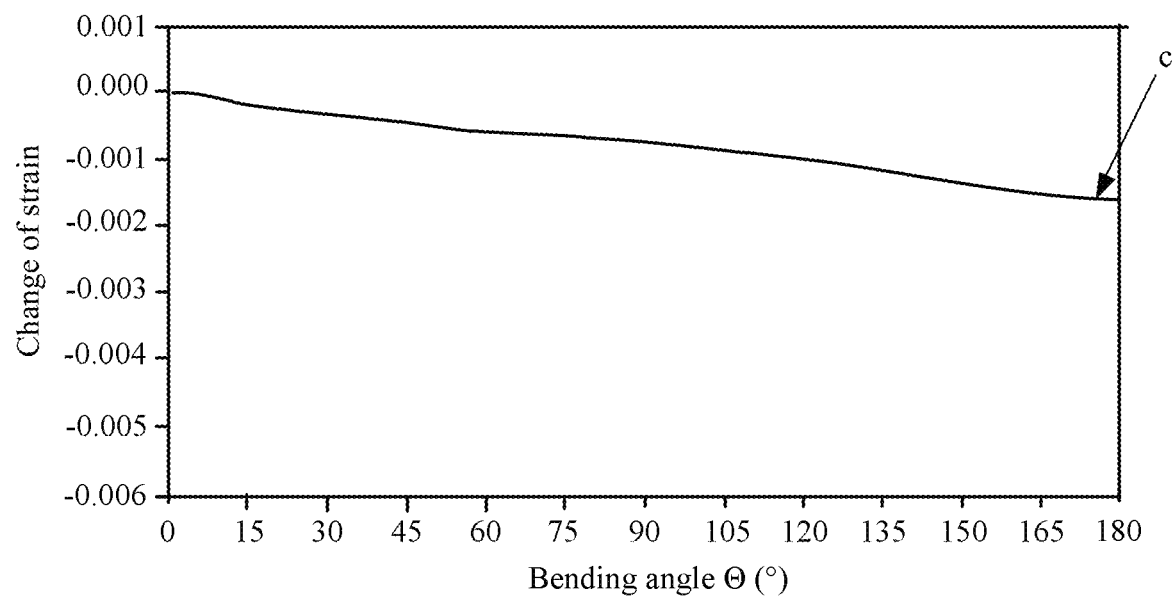
FIG. 5 is a graph of strain signals output from detection units with respect to bending angles in the display panel.

Shown in FIG. 5 is a graph of strain signals output from detection units with respect to bending angles in the display panel. As can be seen from FIG. 5, in a case that the display panel is bent, a curve of the signal output by the detection unit 10 in the second region 200 with respect to the bending angle of the display panel is a monotonic changing curve. Namely, a strain signal outputted by the detection unit in the second region increases as the bending angle of the display panel increases. Usually strain ε is a relative change ΔL of stressed length L ΔL/L. Strain output values of the detection unit are in a function of the bending angles, and different strain output values corresponds to different bending angles.

In the display panel according to one embodiment of the present disclosure, the detection unit is arranged in the second region adjacent to the first region. The detection unit is arranged in the non-bending region adjacent to the bending region. The monotonic strain output from the detection unit in the non-bending region can be used to detect the bending angle of the display panel, and accuracy of an obtained detection result is high.

In addition, in the display panel according to one embodiment of the present disclosure, the detection layer is located within the display panel. Compared with a solution in which the detection layer is located outside the display panel, no additional bonding process is required. Thereby, problems such as a creep introduced by a bonding material used in the bonding process are avoided.

Figure 6:
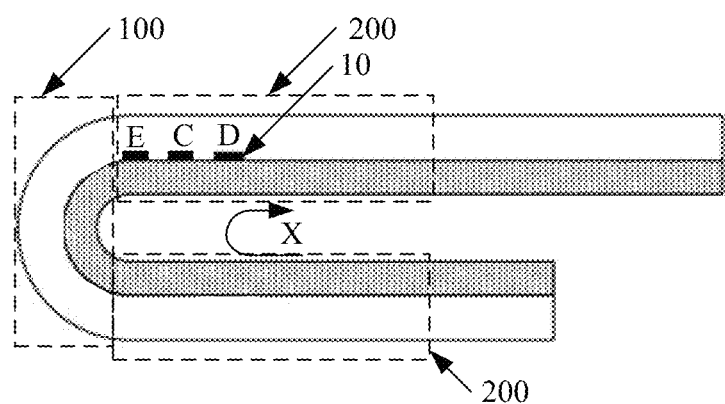
FIG. 6 is schematic diagram of a folded display panel having detection units, according to an embodiment of the present disclosure.
Figure 7:
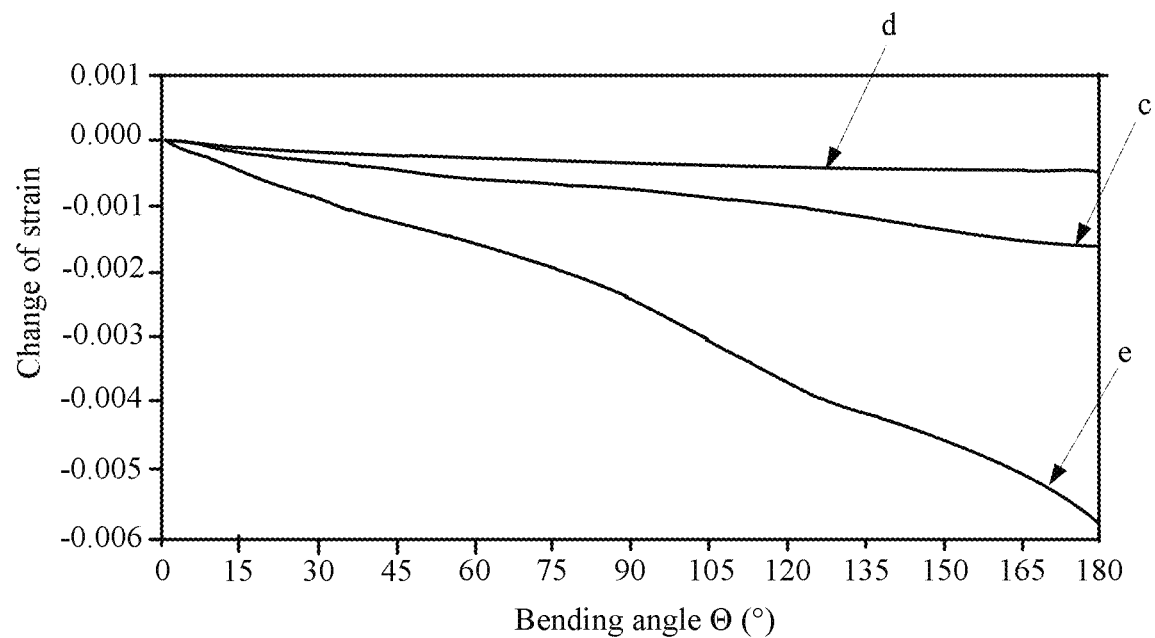
FIG. 7 is a schematic graph of strain signals output from detection units with respect to bending angles in the display panel in FIG. 6.

Reference is made to FIGS. 6 and 7. FIG. 7 is a graph of strain signals output from detection units with respect to bending angles in the display panel, where the detection units are located at positions C, E and E in FIG. 6. Curve c represents signals output from the detection unit 10 in the second region with respect to the bending angle, in a case that the display panel is bent and the detection unit is located at point C of the bending region. Curve d is a changing curve of a signal output by the detection unit 10 in the second region with respect to the bending angle, in a case that the display panel is bent and the detection unit is located at point D of the bending region. Curve e is a changing curve of a signal output by the detection unit 10 in the second region with respect to the bending angle, in a case that the display panel is bent and the detection unit is located at point E of the bending region.

As can be seen from FIG. 7, in a case that the display panel is bent, a changing curve of a strain detected by the detection unit in the second region with respect to the bending angle of the display panel is monotonic. For a same bending angle of the display panel, the closer to the first region the detection unit in the second region is, the greater a change is in the signal detected by the detection unit.

As further shown in FIG. 3, in an embodiment of the present disclosure based on the above embodiment, the second region 200 includes a first side 2001 and a second side 2002 that are opposite along the first direction X. The first side 2001 is a boundary between the first region 100 and the second region 200. The second side 2002 is opposite to the first side 2001, and is a boundary of the second region 200 away from the first region 100. In this embodiment of the present disclosure, a distance L1 between the detection unit 10 and the first side 2001 is smaller than a distance L2 between the detection unit 10 and the second side 2002. Thereby, the detection unit 10 is arranged in the second region 200 at a side close to the first region 100, so as to enhance a signal output by the detection unit 10 for the same bending angle of the display panel. Hence, detection accuracy of the detection unit is improved.

It should be noted that, in the usage of the flexible display, besides the case that the display panel is bent, the strain may also be generated on the detection unit in a case that the display panel is pressed by a user. In daily use, in a case that the display panel is pressed by a user, the signal output by the detection unit located at a position pressed by the user is generally less than. $10^{-4}$.

Figure 8:
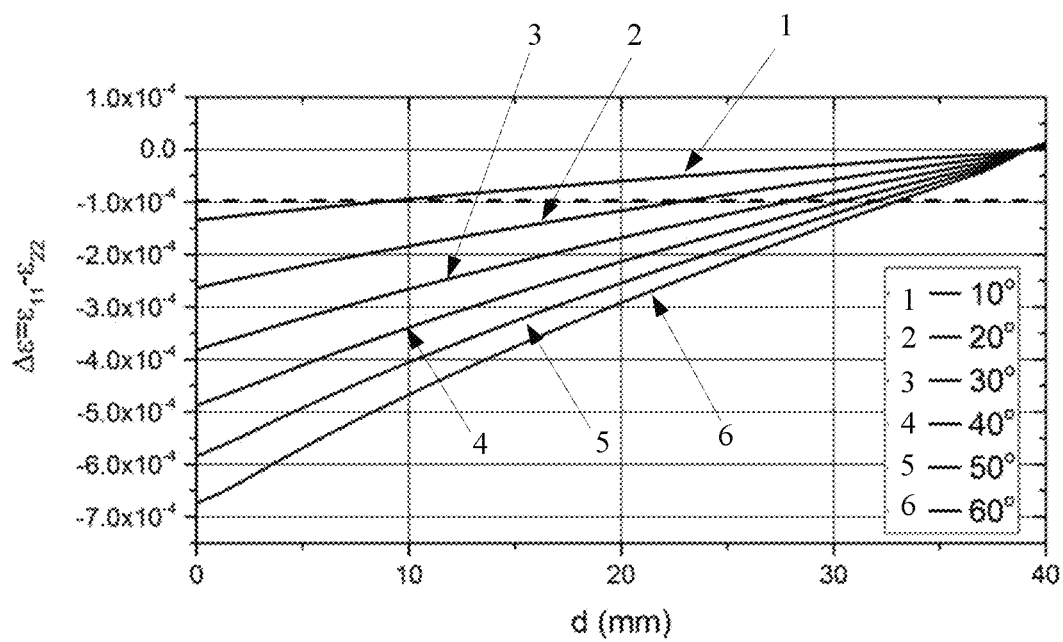
FIG. 8 is a graph of signals output from detection units with respect to distances from a boundary between a first region and a second region, at different bending angles of the display panel.

Shown in FIG. 8 is a schematic graph of changing curves of signals output by a detection unit with respect to different distances from the boundary between the first region and the second region, at different bending angles of a display panel. Curve 1 is a schematic changing curve of a signal output by the detection unit with respect to different distances from the detection unit to the boundary between the first region and the second region, in a case that the bending angle of the display panel is 10°. Curve 2 is a schematic changing curve of a signal output by the detection unit with respect to different distances from the detection unit to the boundary between the first region and the second region, in a case that the bending angle of the display panel is 20°. Curve 3 is a schematic changing curve of a signal output by the detection unit with respect to different distances from the detection unit to the boundary between the first region and the second region, in a case that the bending angle of the display panel is 30°. Curve 4 is a schematic changing curve of a signal output by the detection unit with respect to different distances from the detection unit to the boundary between the first region and the second region, in a case that the bending angle of the display panel is 40°. Curve 5 is a schematic changing curve of a signal output by the detection unit with respect to different distances from the detection unit to the boundary between the first region and the second region, in a case that the bending angle of the display panel is 50°. Curve 6 is a schematic changing curve of a signal output by the detection unit with respect to different distances from the detection unit to the boundary between the first region and the second region, in a case that the bending angle of the display panel is 60°.

As can be seen from FIG. 8, for a same bending angle, the farther the detection unit is from the boundary between the first region and the second region, the smaller the signal (herein referring to magnitude of the strain signal, namely, an absolute value) output by the detection unit is. For a same position (namely, a distance from the detection unit to the boundary between the first region and the second region is identical), the smaller the bending angle of the display panel is, the smaller the strain signal (herein referring to magnitude of the strain signal, namely, an absolute value) output by the detection unit is.

It is required to distinguish whether a variation of the signal generated on the detection unit is due to bending of the display panel or pressing of the user on the display panel, and improve accuracy of detecting the bending angle of the display panel by the detection unit. In an embodiment of the present disclosure based on above embodiment, the strain generated in a region in which the detection unit is located is greater than or equal to $10^{-4}$, so as to use the strain detected and output by the detection unit to distinguish whether the strain is caused by pressing from the user or the bending of the display panel.

Figure 9:
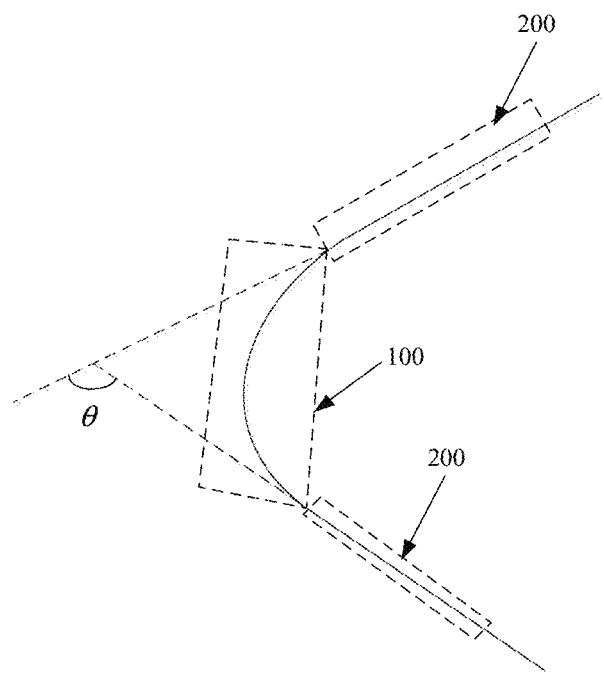
FIG. 9 shows a bending angle of a display panel.

As shown in FIG. 9, in a case that the display panel is bent, the bending angle of the display panel is a complementary angle θ of an angle between two planes, in which the two second regions 200 at two sides of the first region 100 are located. In an embodiment of the present disclosure, the distance y between the detection unit and the first side satisfies 0≤y≤33−55*exp(−0.08*θ), where θ denotes the bending degrees of the display panel, and a unit of y is mm.

Figure 10:
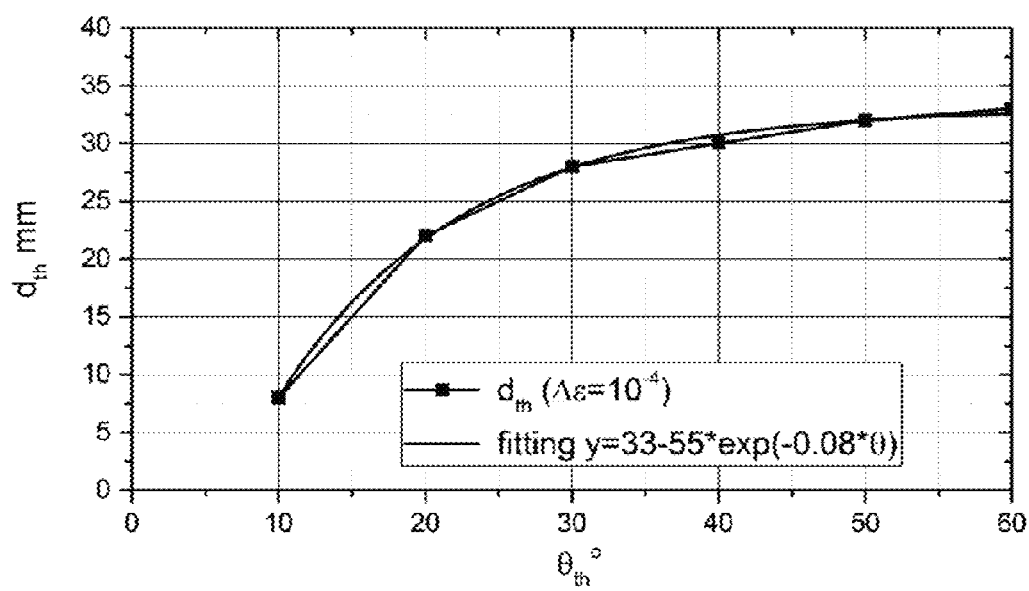
FIG. 10 is the graph of distance from a detection unit to a boundary versus bending angles.

Shown in FIG. 10 is a schematic graph of a distance from a detection unit to a boundary between the first region and the second region with respect to different bending angles of a display panel, when a strain signal output by the detection unit is $10^{-4}$. As can be seen from FIG. 10, the smaller the bending angle of the display panel is, the closer the detection unit is to the boundary between the first region and the second region when the strain signal output by the detection unit is $10^{-4}$. Specifically, in a case that the bending angle of the display panel is 10°, the detection unit should be placed within 8.3 mm from an edge of the bending region (that is, the first side of the second region). In a case that the bending angle of the display panel is 20°, the detection unit should be placed within 21.9 mm from the edge of the bending region.

In an embodiment of the present disclosure based on the above embodiment, it is required to ensure that the bending angle of the display panel is detectable by one of the detection units regardless what the bending angle of the display panel is. A first detection angle of the display panel is a minimum of the bending angle of the display panel that is detectable by the detection unit, also called the threshold detection angle. In a case that the bending angle is equal to the first detection angle, a strain generated in the region in which the detection unit is located should be greater than or equal to $10^{-4}$, so as to use the one detection unit to detect each state of the bending of the display panel.

Specifically, in an embodiment of the present disclosure, a distance y between the detection unit and the first edge satisfies 0≤y≤33−55*exp(−0.08*θ1), where θ1 denotes a minimum bending angle of the display panel, namely, the first detection angle. Thereby, capability of the detection unit to detect states of bending of the display panel is improved. The display panel according to this embodiment of the present disclosure can detect not only the folded state of the display panel, but also other bending states of the display panel.

In one embodiment of the present disclosure, the first detection angle is 10°. The case is not limited herein and depends on a specific situation.

As can be seen from FIG. 8, for a same bending angle, the farther the detection unit is from the boundary between the first region and the second region, the smaller the signal (herein referring to magnitude of the strain signal, namely, an absolute value) output by the detection unit is; and the closer the detection unit is from the boundary between the first region and the second region, the greater the signal (herein referring to magnitude of the strain signal, namely, an absolute value) output by the detection unit is. Therefore, in an embodiment of the present disclosure based on the above embodiment, there is y=0 to improve the change of the signal output by the detection unit to the most extent, in a case the display panel is bent. Thereby, the detection accuracy of the detection unit is improved.

Figure 11:
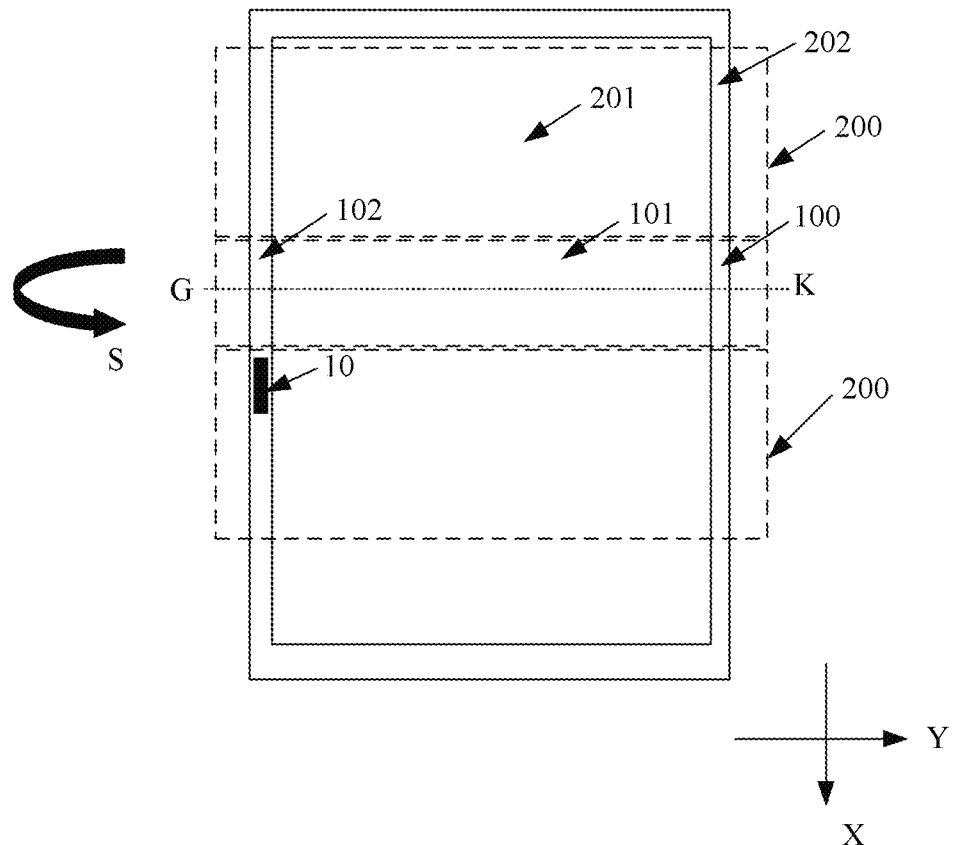
FIG. 11 is a top view of a display panel.

As shown in FIG. 11, in an embodiment of the present disclosure based on any of the above embodiments, the first region 100 includes a first display region 101 and a first frame region 102 that are aligned along a second direction Y. The second region 200 includes a second display region 201 and a second frame region 202 that are aligned the second direction Y. In one embodiment, the detection unit 10 is located in the second frame region 202 of the second region 200, so as to prevent arrangement of the detection unit 10 from influencing the second display region 201 of the display panel. The second direction Y is perpendicular to the first direction X, and the second direction Y and the first direction X are both parallel to a plane in which the display panel is located.

Figure 12:
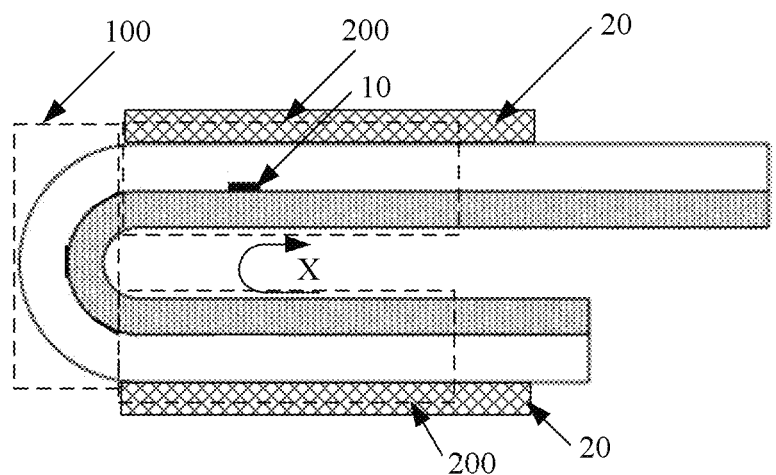
FIG. 12 is a schematic diagram of a display panel according to another embodiment of the present disclosure.

As shown in FIG. 12, in an embodiment of the present disclosure based on any of the above embodiments, the display panel further includes a fixing structure.

The fixing structure includes at least one fixing unit 20. An orthographic projection of at least one detection unit 10 on the plane parallel to the top surface of the display panel is located is covered by an orthographic projection of the fixing unit 20 on the plane in which the display panel is located. Thereby, the region in which the detection unit 10 is located is not bent, so that the change of the signal of the detection unit 10 is mainly due to an influence of the bending region of the display panel on the detection unit.

It should be noted that, in the above embodiment, an orthographic projection of the second region 200 in which the detection unit 10 is located on the plane in which the display panel is located may be completely covered by the orthographic projection of the fixing unit 20 on the plane in which the display panel is located, or may overlap with the orthographic projection of the fixing unit 20 on the plane in which the display panel is located, or may be partially covered by the orthographic projection of the fixing unit 20 on the plane in which the display panel is located. The case is not limited herein, as long as the change of the signal of the detection unit 10 is mainly due to the influence of the bending region of the display panel on the detection unit 10.

As described above, the display panel includes at least two second regions according to the embodiment of the present disclosure. Hence, in an embodiment of the present disclosure, the fixing structure includes at least two fixing units, and the fixing units are in a one-to-one correspondence with the second regions. Thereby, shapes of the second regions are fixed by the fixing units during bending of the display panel, so that the second region is not bent.

Figure 13:
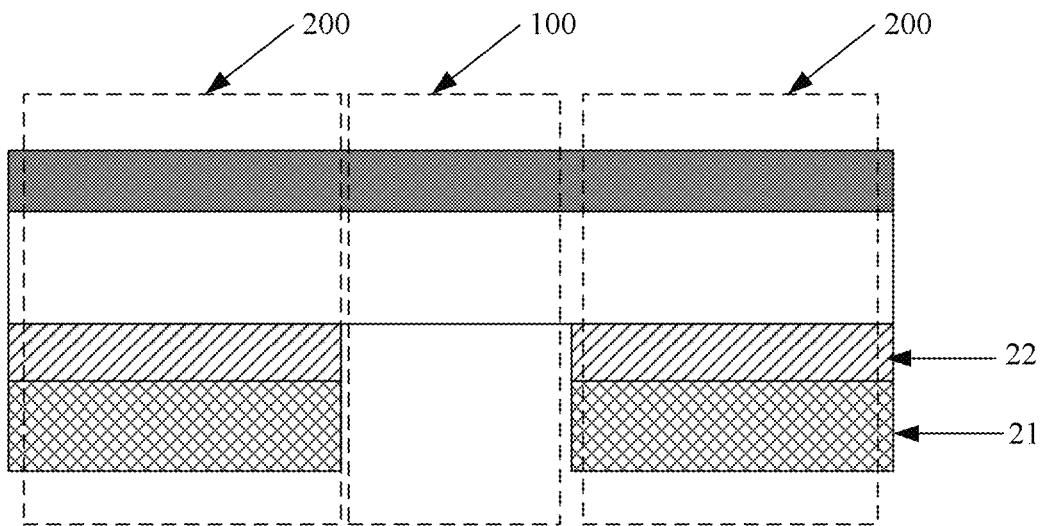
FIG. 13 is a cross-sectional view of a display panel according to another embodiment of the present disclosure.

As shown in FIG. 13, in an embodiment of the present disclosure based on any of the above embodiments, the fixing unit includes a fixing member 21 and a first connecting member 22. The fixing member 21 and another component of the display panel are fixedly connected by the first connecting member 22. Thereby, a fixed connection is achieved between the fixing member 21 and another component of the display panel, by using the first connecting member 22.

It should be noted that, in this embodiment of the present disclosure, the first connecting member is only located in the second region. In one embodiment, an orthographic projection of the first connecting member on the plane in which the display panel is located does not overlap with an orthographic projection of the first region on the plane in which the display panel is located. Thereby, bendability of the first region of the display panel is ensured by providing a space between adjacent first connecting members, so as to prevent the first connecting members from influencing the bending of the first region of the display panel. The case is not limited herein. According to another embodiment of the present disclosure, the orthographic projection of the first connecting member on the plane in which the display panel is located may partially overlap with the orthographic projection of the first region on the plane in which the display panel is located. Namely, a portion of the first connecting member protrudes from the second region into the first region, along a direction from the second region to the first region, as long as it is ensured that arrangement of the first connecting member does not influence the bending of the first region of the display panel.

Specifically, in an embodiment of the present disclosure, the fixing member is made of a material with certain hardness, such as a plastic or a metal, and the first connecting member is made of a photosensitive adhesive or a pressure-sensitive adhesive. The case is not limited herein, as long as it is ensured that the second region is kept not bent by the fixing member, and the fixing member is connected in a fixed connection via the first connecting member to another component of the display panel.

Figure 14:
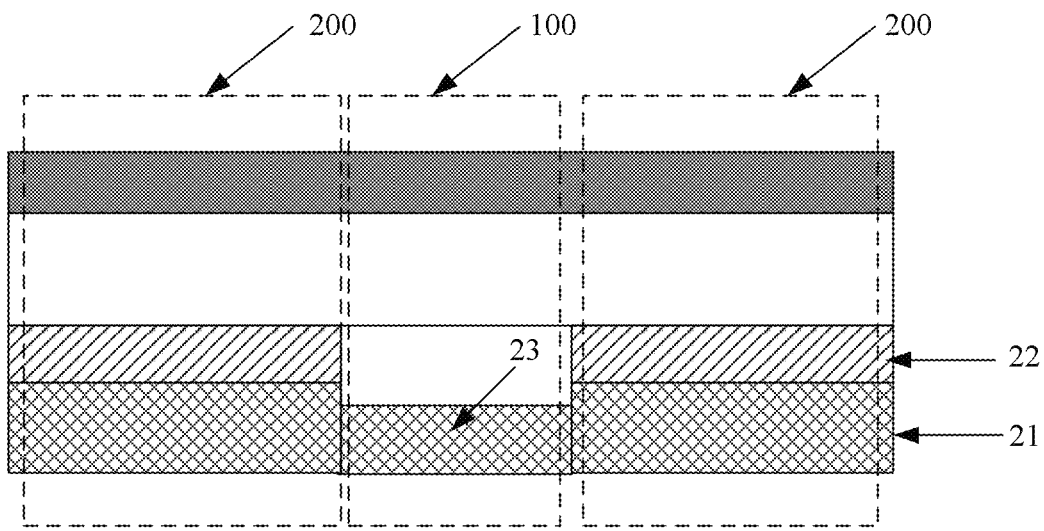
FIG. 14 is a cross-sectional view of a display panel according to another embodiment of the present disclosure.

As shown in FIG. 14, in an embodiment of the present disclosure based on any of the above embodiments, the fixing structure further includes a second connecting member 23 connecting the two adjacent fixing members 21. An orthographic projection of the second connecting member 23 on the plane in which the display panel is located is located within the orthographic projection of the first region 100 on the plane in which the display panel is located. Thereby, the connection of two adjacent fixing members 21 is achieved by using the second connecting member 23. In one embodiment, the second connecting member 23 may be a deformable structural member, so as to ensure the bendability of the first region 100.

Specifically, in an embodiment of the present disclosure further as shown in FIG. 14, the second connecting member 23 and the fixing member 21 are formed as an integral structure. In a case that the display panel is not bent, a thickness of the second connecting member 23 is smaller than a thickness of the fixing member 21 in a direction perpendicular to the plane in which the display panel is located. Thereby, flexibility of the second connecting member 23 is greater than flexibility of the fixing member 21, so as to ensure the bendability of the first region 100 while connecting the adjacent two fixing members 21.

In an embodiment of the present disclosure, the second connecting member may be a hinge. Thereby, the bendability of the first region is ensured by using the hinge, while achieving connection of the adjacent two fixing members. The case is not limited herein. In another embodiment of the present disclosure, the second connecting member may be other deformable structural members, which depends on a requirement of the display panel, as long as it is ensured that arrangement of the second connecting member does not influence the bendability of the first region.

Figure 15:
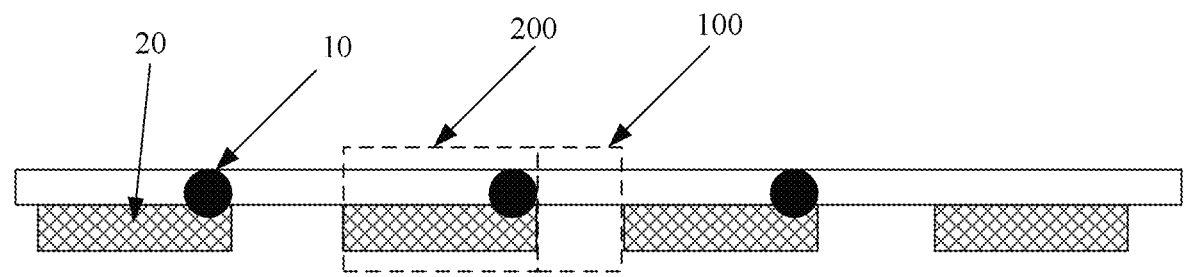
FIG. 15 is a cross-sectional view of a display panel according to another embodiment of the present disclosure.
Figure 16:
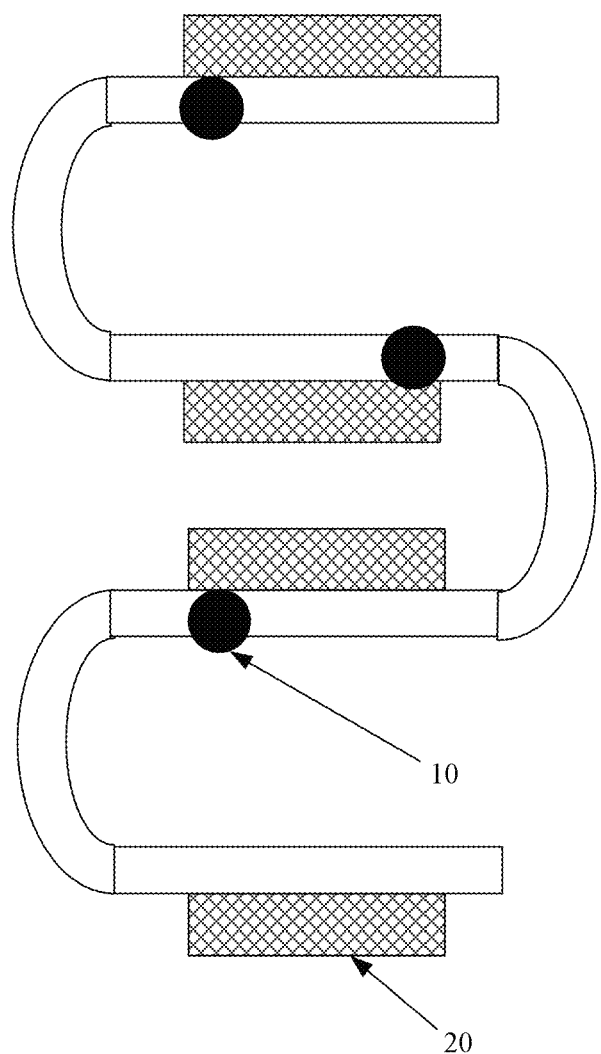
FIG. 16 is a schematic structural diagram of a multiply folded display panel according to another embodiment of the present disclosure.

As shown in FIGS. 15 and 16, in an embodiment of the present disclosure based on any of the above embodiments, the display panel includes multiple first regions 100 and multiple second regions 200 along the first direction. The first regions 100 and the second regions 200 are alternately arranged. It should be noted that specific quantities of the first regions and the second regions in the display panel are not limited in this embodiment of the present disclosure, as long as there is a second region on each of two sides of any first region, that is, there are two non-bending regions respectively on two sides of any bending region.

The display panel according to an embodiment of the present disclosure is hereinafter described in an example, in which the display panel includes three first regions and four second regions (that is, the display panel includes three bending regions and four non-bending regions).

It can be seen from the above that, for a same bending angle, the farther the distance between the detection unit and the bending region of the display panel is, the smaller the change in the strain detectable for the detection unit is, the smaller the change of the signal output by the detection unit is. In an embodiment of the present disclosure based on the above embodiments, the detection layer includes multiple detection units in a case that the display panel includes at least two first regions. The multiple detection units each is in a one-to-one correspondence with one of the first regions. Thereby, there is a detection unit arranged in the vicinity of a position of any first region, and the bending angle of the display panel in each first region is detected by the detection unit closest to the position of such first region.

It should be noted that, in this embodiment of the present disclosure, one first region may correspond to one detection unit, or correspond to at least two detection units, which is not limited herein. In a case that one first region correspond to at least two detection units, a detection array may be formed by the at least two detection units, to detect bending of the first region of the display panel.

In an embodiment of the present disclosure based on the above embodiments, one first region corresponds to one detection unit. In an embodiment of the present disclosure, the display panel includes multiple first regions and multiple detection units, and the adjacent detection units correspond to different first regions to reduce mutual influences among the multiple detection units. Namely, only one detection unit is arranged in one second region, as shown in FIGS. 15 and 16. The case is not limited herein and depends on a specific situation.

Figure 17:
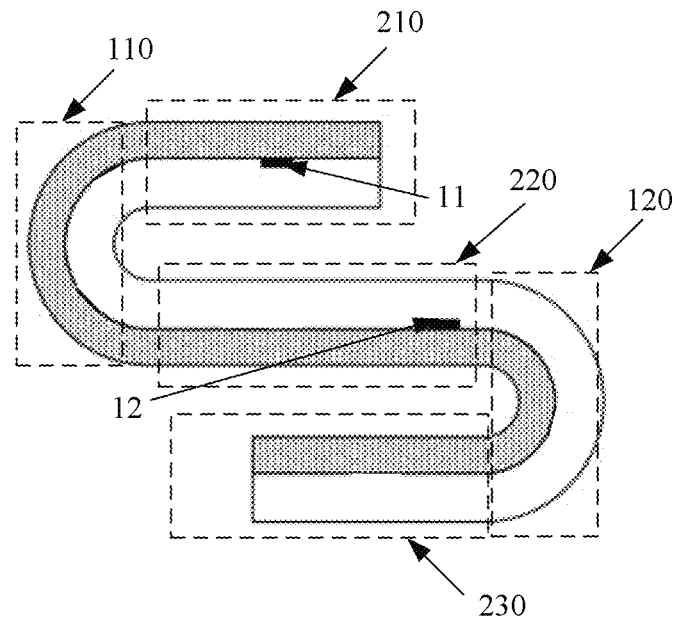
FIG. 17 is a schematic structural diagram of a twice folded display panel according to another embodiment of the present disclosure.

The display panel according to an embodiment of the present disclosure is described by taking an example, in which the display panel includes two first regions and three second regions (namely, the display panel includes two bending regions and three non-bending regions). As shown in FIG. 17, in an embodiment of the present disclosure, the display panel includes a first second region 210, a first first region 110, a second second region 220, and a second first region 120, and a third second region 230 that are aligned along the first direction, and includes a first detection unit 11 configured to detect a bending angle of the first first region 110 and a second detection unit 12 configured to detect a bending angle of the second first region 120. In this embodiment of the present disclosure, the first detection unit 11 is located in the first second region 210, and the second detection unit 12 is located in the second second region 220. Hence, an influence of bending of the second first region 120 on the first detection unit 11 is reduced, and a mutual influence between the first detection unit 11 and the second detection unit 12 is reduced.

Figure 18:
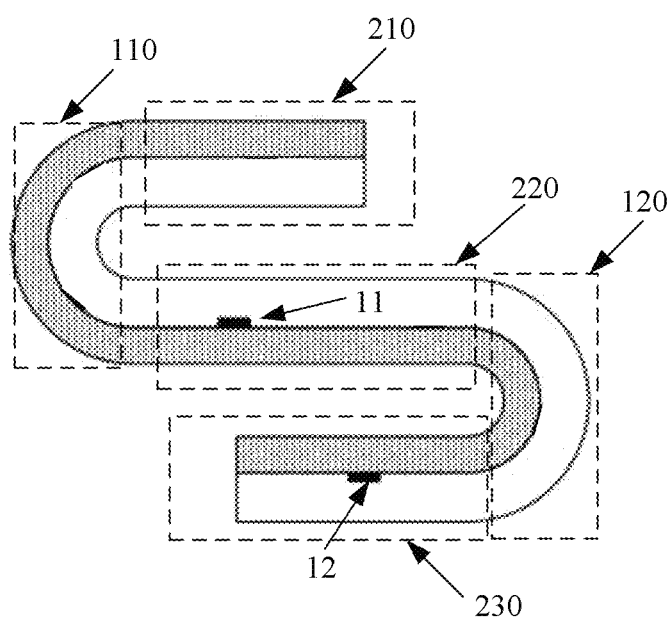
FIG. 18 is a schematic structural diagram of a twice folded display panel according to another embodiment of the present disclosure.

In another embodiment of the present disclosure as shown in FIG. 18, the first detection unit 11 is located in the second second region 220, and the second detection unit 12 is located in the third second region 230. Thereby, an influence of bending of the first first region 110 on the second detection unit 12 is reduced, and a mutual influence between the first detection unit 11 and the second detection unit 12 is reduced.

Figure 19:
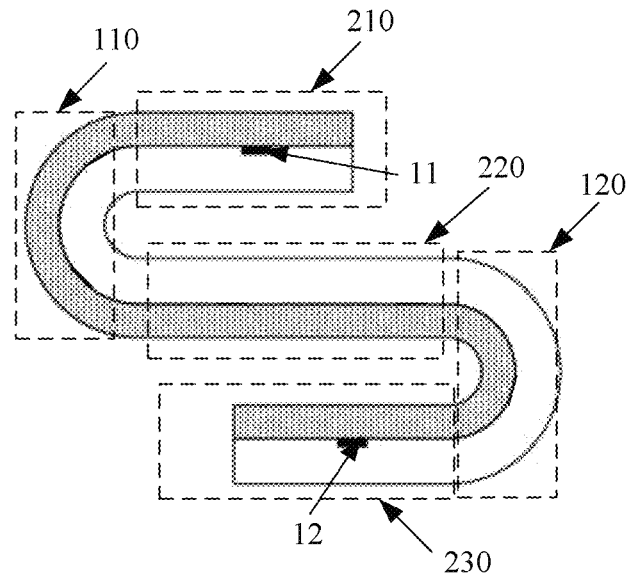
FIG. 19 is a cross-sectional view of a twice folded display panel according to another embodiment of the present disclosure.

In another embodiment of the present disclosure as shown in FIG. 19, the first detection unit 11 is located in the first second region 210, so as to reduce an influence of bending of the second first region 120 on the first detection unit 11. The second detection unit 12 is located in the third second region 230, so as to reduce an influence of bending of the first first region 110 on the second detection unit 12.

Figure 20:
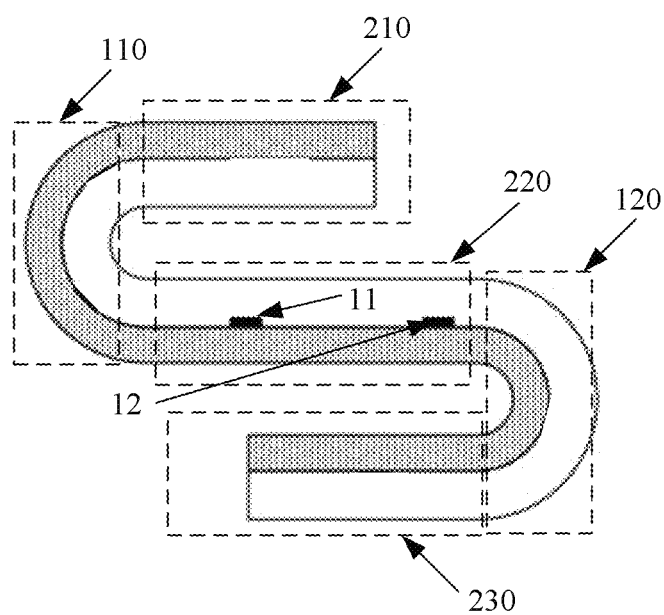
FIG. 20 is a schematic structural diagram of a display panel according to another embodiment of the present disclosure.

In another embodiment of the present disclosure as shown in FIG. 20, the first detection unit 11 and the second detection unit 12 may both be located in the second second region 220. The first detection unit 11 is located at a side of the second second region 220 adjacent to the first first region 110, and the second detection unit 12 is located at a side of the second second region 220 adjacent to the second first region 120.

In one embodiment, in an embodiment of the present disclosure, there is a large quantity of the first regions included in the display panel. The signals output by the multiple detection units are changed in a case one of the first regions is bent. In such case, the signal changing most among the multiple output signals is taken as a detection signal for such first region. The signals output from the multiple detection units are changed in a case that the multiple first regions in the display panel are bent. In such case, a signal output from the detection unit closest to each first region positions is taken as a detection signal of such first region. The case is not limited herein. In other embodiments of the present disclosure, besides taking the signal output from the detection unit closest to each first region as the detection signal of such first region, the detection result may be corrected by using a bending angle corresponding to a signal output by another detection unit, so as to improve the detection accuracy. The case depends on a specific situation.

It should be noted that, in any of the above embodiments, in a case that the bending of the first region in the display panel is detected based on the signal output by the detection unit, a preset database may be queried by using the signal output by the detection unit, to obtain a state of bending corresponding to the signal. The bending angles corresponding to each change of the strain are stored in the preset database.

Figure 21:
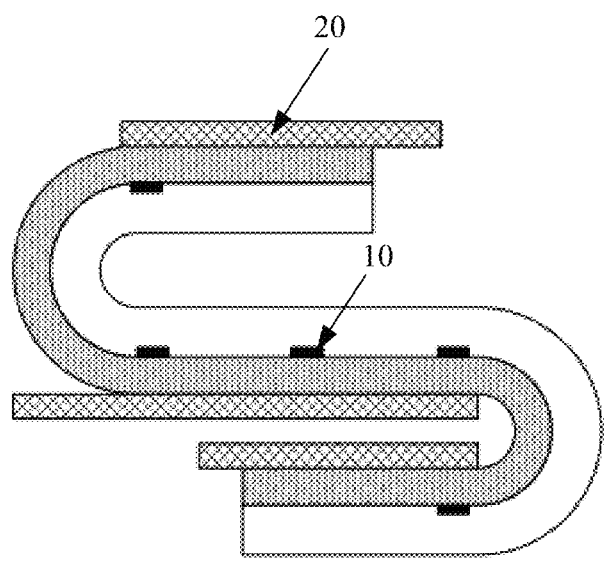
FIG. 21 is a schematic structural diagram of a twice folded display panel according to another embodiment of the present disclosure.

As shown in FIG. 21, in an embodiment of the present disclosure, one or more detection units 10 may be provided in one second region. The case is not limited herein, as long as the projection of the detection unit 10 on the plane in which the display panel is located is located within the projection of the fixing unit 20 on the plane in which the display panel is located. The cased is not limited herein and depends on a specific situation.

Figure 22:
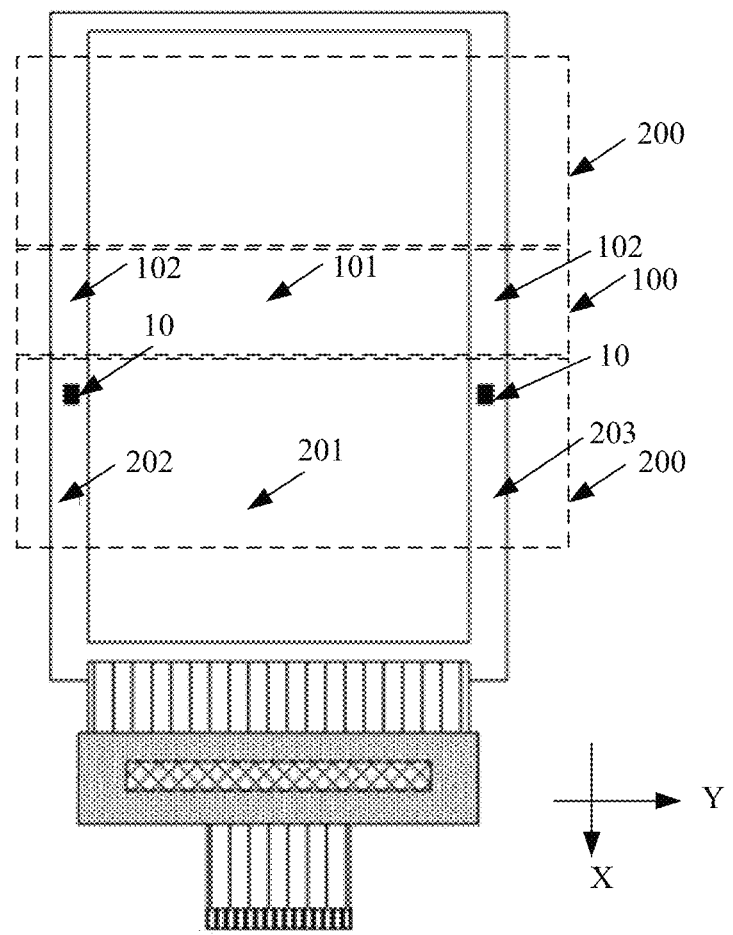
FIG. 22 is a top view of a display panel according to an embodiment of the present disclosure.

As shown in FIGS. 22, in an embodiment of the present disclosure based on any of the above embodiments, one first region 10 corresponds to at least two detection units 10. The at least two detection units 10 are arranged along the second direction Y. Thereby, bending of the first region 100 is detected by the at least two detection units 10, and the detection accuracy is improved. The second direction Y is perpendicular to the first direction X, and the second direction Y and the first direction X are both parallel to the plane in which the display panel is located.

As further shown in FIGS. 22, in an embodiment of the present disclosure based on the above embodiment, a quantity of the detection units 10 corresponding to one first region 100 is two. The first region 100 includes a first display region 101 and a first frame region 102 that are aligned along the second direction Y. The second region 200 includes a second display region 201 and a second frame region that are aligned along the second direction Y. The second frame region includes a first sub-frame region 202 and a second sub-frame region 203 that are respectively located at two sides of the second display region 201. The two detection units 10 corresponding to one first region 100 are located in the first sub-frame region 202 and second sub-frame region 203, respectively. Thereby, bending of the first region 100 is detected by the detection units 10 on both sides of the second display region 201 in the second region 200. The case is not limited herein. In another embodiment of the present disclosure, the two detection units 10 corresponding to one first region 100 may be both located in the first sub-frame region 202 or the second sub-frame region 203, or one first region 100 corresponds to three or more detection units 10. The case is not limited herein and depends on a specific situation.

Figure 23:
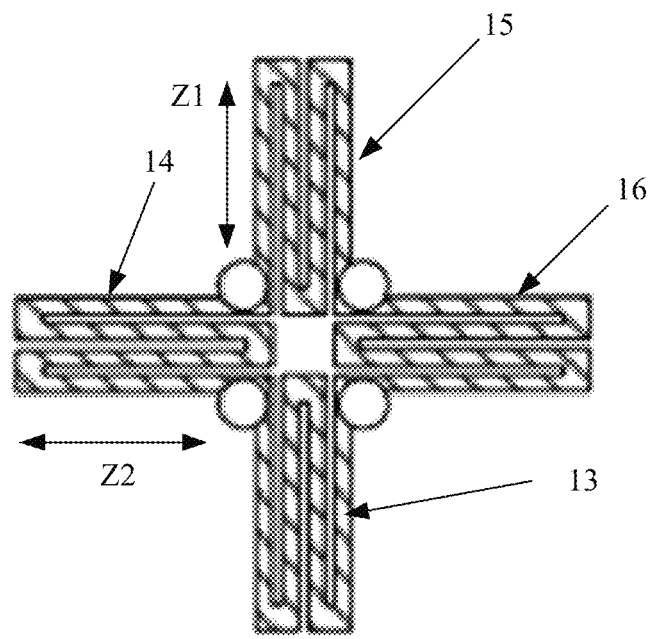
FIG. 23 is a schematic structural diagram of a detection unit in a display panel according to an embodiment of the present disclosure.

In an embodiment of the present disclosure based on any of the above embodiments, the detection unit includes a Wheatstone bridge structure, as shown in FIGS. 23. The Wheatstone bridge structure includes a first bridge branch 15, a second bridge branch 16, a third bridge branch 13 and a fourth bridge branch 14 that are connected in an end-to-end manner and located in a same plane (which is parallel to a display surface of the display panel). A first bridge arm includes the first bridge branch 15 and the third bridge branch 13, and a second bridge arm includes the the second bridge branch 16 and the fourth bridge branch 14. An angle between the first bridge arm and the second bridge arm is greater than 0° and is smaller than or equal to 90°. In one embodiment of the present disclosure, a direction Z1 of maximum strain of the first bridge arm is perpendicular to a bending axis GK of the first region 100 corresponding to such detection unit 10 (as shown in FIG. 11). Thereby, the strain on the first bridge arm is increased and the detection accuracy of the detection unit is improved, in a case that the display panel is bent. The display panel is bent along a direction S.

In an embodiment of the present disclosure based on the above embodiment, the angle between the first bridge arm and the second bridge arm is 90°. Namely, the first bridge arm and the second bridge arm are perpendicular. Thereby, on the basis of increasing the strain on the first bridge arm in a case that the display panel is bent, a direction Z2 of maximum strain of the second bridge arm is parallel to the bending axis GK of the first region, so as to reduce the strain on the second bridge arm in the case that the display panel is bent. A difference between the strain on the first bridge arm and the strain on the second bridge arm is increased, further improving the detection accuracy of the detection unit.

It should be noted that, in the above embodiment, the first bridge arm and the second bridge arm are perpendicular. Thereby, in the case that the display panel is bent, the strains generated in the second bridge branch and the fourth bridge branch of the second bridge arm are substantially identical, reducing an influence of a difference between strains of the second bridge branch and the fourth bridge branch on the detection accuracy.

It should be noted that, in any of the above embodiments, the strain is generated both on the first bridge arm and the second bridge arm in the case that the display panel is bent. A signal for detecting the state of the bending of the display panel is a difference between the strains on the first bridge arm and the second bridge arm, so as to improve the detection accuracy.

In an embodiment of the present disclosure based on any of the above embodiments, the first bridge branch, the second bridge branch, the third bridge branch, and the fourth bridge branch are in a serpentine shape (as shown in FIG. 23). Thereby, lengths of the first bridge branch, the second bridge branch, the third bridge branch and the fourth bridge branch are increased in respective directions of maximum strain. For a same bending angle, the change of the signal output from the detection unit is increased, further improving the accuracy of the detection result.

In one embodiment of the present disclosure based on any of the above embodiments, the first bridge branch, the second bridge branch, the third bridge branch, and the fourth bridge branch are made of low temperature poly-silicon. Thereby, rates of resistance change of the first bridge branch, the second bridge branch, the third bridge branch, and the fourth bridge branch are increased under a same circumstance. For a same bending angle, the change of the signal output from the detection unit is further increased, improving the accuracy of the detection result. The case is not limited herein. In another embodiment of the present disclosure, the first bridge branch, the second bridge branch, the third bridge branch, and the fourth bridge branch may be made of metal. The case depends on a specific situation.

In addition, in an embodiment of the present disclosure, positions of the bridge branches in the detection unit are relatively concentrated. In a case that the display panel is subjected to creeps or temperature changes, influences on each bridge branch in the detection unit are substantially identical and thereby counteract each other. The stability of the signal output from the detection unit is improved, and thereby the detection accuracy is improved in detecting bending of the display panel with the detection unit.

In an embodiment of the present disclosure based on the above embodiments, the signal output by the detection unit is zero in a case that the display panel is not bent. Hence, the signal output by the detection unit is a specific signal for detecting the state of the bending of the display panel, in the case that the display panel is bent. In another embodiment of the present disclosure, the signal output by the detection unit is a non-zero fixed value, in a case that the display panel is not bent. Hence, the signal output by the detection unit is a sum of the fixed value and a signal change caused by bending of display panel, in a case that the display panel is not bent. In this embodiment of the disclosure, the specific signal for detecting the state of the bending of the display panel is a difference between the signal output by the detection unit and the fixed value. The case is not limited herein and depends on a specific situation.

In an embodiment of the present disclosure based on any of the above embodiments, the display panel includes a first surface and a second surface which are opposite, and includes a neutral plane located between the first surface and the second surface. The first surface is the display surface of the display panel, namely, an upper surface of the display panel. The second surface is a lower surface of the display panel. It should be noted that the signal output from the detection unit in a case that the display panel is not bent is substantially identical to the signal output from a detection unit located in the neutral plane in a case that the display panel is bent. In an embodiment of the present disclosure based on any of the above embodiments, the detection layer is located between the first surface and the neutral plane, or t between the second surface and the neutral plane. The case is not limited herein, as long as the detection layer is not located in the neutral plane.

It should be noted that, in this embodiment of the present disclosure, the detection unit may detect a state in which the display panel is bent outward (such as the second first region 120 in FIG. 17), and may also detect a state in which the display panel is bent inward (such as the first first region 110 in FIG. 17). The case is not limited herein and depends on a specific situation. In a case the display panel is bent outward, the first surface faces outward, and the second surface faces inward. In a case that the display panel is bend inward, the first surface faces inward, and the second surface faces outwards.

It should be noted that, in this embodiment of the present disclosure, the detection layer may be located between the neutral plane and the first surface. In a case the display panel is bent inward, the signal output from the detection unit is negative in value. In a case the display panel is bent outward, the signal output from the detection unit is positive in value. The detection layer may be located between the neutral plane and the second surface. In a case the display panel is bent inward, the signal output by the detection unit is positive in value. In a case that the display panel is in bent outward, the signal output from the detection unit is negative in value.

Correspondingly, a display apparatus is further provided according to an embodiment of the disclosure, including the display panel according to any of the above embodiments. In one embodiment of the present disclosure, the display panel is an OLED display panel. The case is not limited herein and depends on a specific situation.

Figure 24:
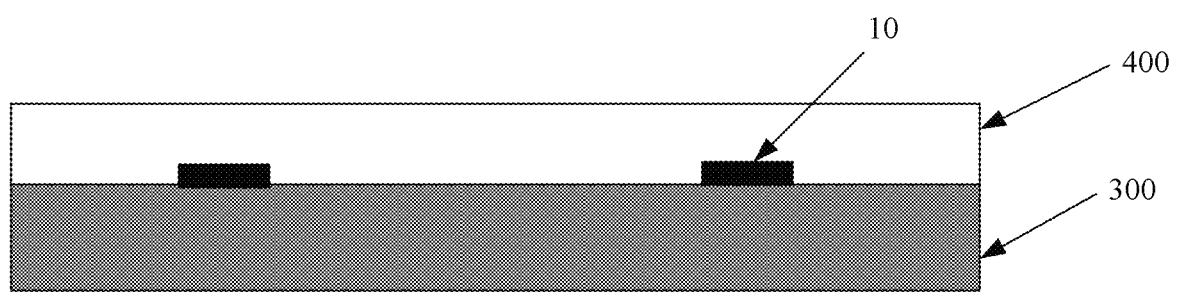
FIG. 24 is a schematic structural diagram of a display apparatus according to an embodiment of the present disclosure.

In one embodiment, the display panel is an OLED display panel. As shown in FIG. 24, the display panel includes an array substrate 300, and a packaging layer 400 located on a surface of the array substrate 300. The detection layer is integrated on the array substrate, and specifically, may be located at an uppermost layer of the array substrate 300. Namely, the detection unit 10 is in direct contact with the packaging layer 400. Thereby, a thickness of the display panel is reduced while integrating the detection layer on the display panel. The case is not limited herein and depends on a specific situation.

In view of the above, the display panel and the display apparatus are provided according to the embodiments of the present disclosure. The detection unit is arranged in the second region adjacent to the first region. Namely, the detection unit is arranged in the non-bending region adjacent to the bending region. The bending angle of the display panel is detected by utilizing the monotonically changing strain output by the detection unit in the non-bending region. Accuracy of the obtained detection result is high.

Further, in the display panel and the display apparatus according to one embodiment of the present disclosure, not only a state of bending is detectable in a case that the display panel is folded, but also a state of bending is detectable in a case that the display panel is bent with any bending angle. A range of detection is wide. In addition, in the display panel according to one embodiment of the present disclosure, the detection layer is located within the display panel. Compared with a solution in which the detection layer is located outside the display panel, no additional bonding process is required. Thereby, problems such as a creep introduced by a bonding material used in the bonding process are avoided, stability of a detection signal is improved, and the detection accuracy is further improved.

The embodiments of the present disclosure are described in a progressive manner, and in each embodiment, emphasis is placed on the difference from other embodiments. One embodiment can refer to other embodiments for the same or similar parts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A display panel, comprising:
at least one first region;
at least two second regions; and
a detection layer;
wherein the at least one first region and the at least two second regions are adjacently aligned along a first direction, and each of the at least one first region is located between adjacent ones of the at least two second regions;
wherein the at least one first region is a bendable region, and the at least two second regions are not bendable;
wherein the detection layer comprises at least one detection unit, located in the at least two second regions, wherein the at least one detection unit is configured to detect bending of the at least one first region;
wherein the display panel further comprises a fixing structure, and the fixing structure comprises two fixing units;
wherein the two fixing units overlap with two second regions of the at least two second regions, respectively, so that the two second regions are not bent;
wherein on surfaces of the two second regions, orthographic projections of two detection units of the at least one detection unit overlap with orthographic projections of the two fixing units, respectively, so that regions in which the two detection units are located are not bendable;
wherein each of the two fixing units comprises a fixing member and a first connecting member, and the fixing member is fixedly connected via the first connecting member to a layer of the display panel;
wherein the first connecting member of one of the two fixing units is separated from the first connecting member of another of the two fixing units by a first region of the at least one first region, and the first region is adjacent to both of the two second regions; and
wherein the layer of the display panel extends across the first region, and is located between the detection layer and the two fixing units.

2. The display panel according to claim 1, wherein:
said detection unit that is located in one of the at least two second regions is configured to detect bending of one of the at least one first region,
the one of the at least two second regions is adjacent to the one of the at least one first region, and
along the first direction, a distance between said detection unit and the one of the at least one first region is smaller than half of a length of the one of the at least two second regions.

3. The display panel according to claim 2, wherein a strain generated at said detection unit is greater than or equal to $10^{-4}$, when a bending angle exceeds a first bending angle;
wherein the bending angle of the display panel is a complementary angle of an angle between two of the at least two second regions, the two of the at least two second regions are adjacent to a bent one of the at least one first region, and the two of the at least two second regions are located at two opposite sides of the bent one of the at least one first region; and wherein the first bending angle of the display panel is a threshold detection angle that is detected by said detection unit.

4. The display panel according to claim 3, wherein the distance y between said detection unit and the one of the at least one first region satisfies:

$$0 \leq y \leq 33 - 55 * \exp(-0.08 * \theta),$$

wherein, θ1 denotes the first bending angle.

5. The display panel according to claim 4, wherein y=0.

6. The display panel according to claim 1,
wherein the at least one first region comprises a first display region and a first frame region that are aligned along a second direction;
wherein the at least two second regions comprises a second display region and a second frame region that are aligned along the second direction;
wherein said detection unit is located in the second frame region of the at least two second regions; and
wherein the second direction is perpendicular to the first direction.

7. The display panel according to claim 1, wherein the fixing member is made of plastic or metal, and the first connecting member is made of an optical adhesive or a pressure-sensitive adhesive.

8. The display panel according to claim 1, wherein:
the fixing structure further comprises a second connecting member connecting two adjacent fixing members, and
the second connecting member overlaps with the at least one first region.

9. The display panel according to claim 1, wherein a quantity of the at least one first region is greater than one, and the at least one first region and the at least two second regions are alternately arranged along the first direction.

10. The display panel according to claim 9, wherein the at least one first region and the at least one detection unit are in a one-to-one correspondence, wherein the at least one detection unit is configured to detect a bending of the at least one first region, respectively.

11. The display panel according to claim 1, wherein:
the at least one detection unit comprises a Wheatstone bridge structure, and the Wheatstone bridge structure comprises a first bridge branch, a second bridge branch, a third bridge branch and a fourth bridge branch that are connected in an end-to-end manner;
a first bridge arm comprises the first bridge branch and the third bridge branch, and a second bridge arm comprises the second bridge branch and the fourth bridge branch;
an angle between the first bridge arm and the second bridge arm is greater than 0° and is smaller than or equal to 90°; and
a direction of maximum strain on the first bridge arm is perpendicular to a bending axis of a corresponding one of the at least one first region.

12. The display panel according to claim 1, wherein:
one of the at least one first region corresponds to at least two of the at least one detection unit, and the at least two detection units are aligned in a second direction, and
the second direction is perpendicular to the first direction.

13. The display panel according to claim 12, wherein:
the one of the at least one first regions corresponds to two of the at least one detection unit; and
the at least one first region comprises a first display region and a first frame region aligned along the second direction, and the second region comprises a second display region and a second frame region aligned along the second direction;
the second frame region comprises a first sub-frame region and a second sub-frame region that are located at two sides of the second display region, respectively; and
the two of the at least one detection unit corresponding to the one of the at least one first region are located in the first sub-frame region and the second sub-frame region, respectively.

14. The display panel according to claim 1, comprising:
a first surface and a second surface that are opposite, and
a neutral plane located between the first surface and the second surface, wherein:
the first surface is a display surface of the display panel, and the detection layer is located between the first surface and the neutral plane or between the second surface and the neutral plane.

15. A display apparatus, comprising the display panel according to claim 1.

16. A display panel, comprising:
at least one first region;
at least two second regions; and
a detection layer;
wherein the at least one first region and the at least two second regions are adjacently aligned along a first direction, and each of the at least one first region is located between adjacent ones of the at least two second regions;
wherein the at least one first region is a bendable region, and the at least two second regions are not bendable;
wherein the detection layer comprises at least one detection unit, located in the at least two second regions, wherein the at least one detection unit is configured to detect bending of the at least one first region;
wherein the display panel further comprises: a first surface and a second surface that are opposite, and a neutral plane located between the first surface and the second surface; and
wherein the first surface is a display surface of the display panel;
wherein when the at least one detection unit is located at the neutral plane, a signal outputted from the at least one detection unit in response to the display panel being not bent is identical to the signal outputted from the at least one detection unit in response to the display panel being bent; and
wherein the at least one detection unit is located between the first surface and the neutral plane.

* * * * *